US012581489B2

(12) United States Patent
Zheng et al.

(10) Patent No.: US 12,581,489 B2
(45) Date of Patent: Mar. 17, 2026

(54) RESOURCE REQUEST METHOD, ALLOCATION METHOD, AND ACQUISITION METHOD

(71) Applicant: VIVO MOBILE COMMUNICATION CO., LTD., Guangdong (CN)

(72) Inventors: Qian Zheng, Guangdong (CN); Xiaodong Yang, Guangdong (CN); Wei Bao, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 489 days.

(21) Appl. No.: 17/592,298

(22) Filed: Feb. 3, 2022

(65) Prior Publication Data

US 2022/0159695 A1 May 19, 2022

Related U.S. Application Data

(63) Continuation of application No. PCT/CN2020/109203, filed on Aug. 14, 2020.

(30) Foreign Application Priority Data

Aug. 15, 2019 (CN) .......................... 201910755340.8

(51) Int. Cl.
| | |
|---|---|
| *H04W 72/20* | (2023.01) |
| *H04W 72/1263* | (2023.01) |
| *H04W 72/23* | (2023.01) |
| *H04W 88/04* | (2009.01) |

(52) U.S. Cl.
CPC ....... *H04W 72/20* (2023.01); *H04W 72/1263* (2013.01); *H04W 72/23* (2023.01); *H04W 88/04* (2013.01)

(58) Field of Classification Search
CPC .............. H04W 72/543; H04W 72/04; H04W 72/56; H04W 28/02; H04W 72/21; H04W 36/305; H04W 76/19
See application file for complete search history.

(56) References Cited

U.S. PATENT DOCUMENTS

| | | | | |
|---|---|---|---|---|
| 11,582,718 B2 * | 2/2023 | Yu | .......................... | H04W 80/08 |
| 2015/0271860 A1 | 9/2015 | Baghel et al. | | |
| 2017/0353819 A1 * | 12/2017 | Yin | ........................ | H04W 72/21 |
| 2018/0054755 A1 | 2/2018 | Lee et al. | | |
| 2018/0069618 A1 | 3/2018 | Loehr et al. | | |
| 2018/0206176 A1 * | 7/2018 | Panteleev | ............. | H04W 28/04 |

(Continued)

FOREIGN PATENT DOCUMENTS

| | | |
|---|---|---|
| CN | 102045851 A | 5/2011 |
| CN | 102469509 A | 5/2012 |

(Continued)

OTHER PUBLICATIONS

Nokia et al., Sidelink resource allocation for FeD2D communication, 3GPP TSG RAN WG1 Meeting #90, R1-1714001, Aug. 21-25, 2017, p. 1-5, Prague, Czech Republic.

(Continued)

*Primary Examiner* — Iqbal Zaidi

(74) *Attorney, Agent, or Firm* — IP & T GROUP LLP

(57) ABSTRACT

A resource request method includes: sending a first buffer status report (BSR) to a network device, the first BSR being used for requesting a second resource from the network device, and the second resource being a resource used for data transmission from a relay user equipment to the network device.

18 Claims, 5 Drawing Sheets

(56)  References Cited

U.S. PATENT DOCUMENTS

| | | | |
|---|---|---|---|
| 2018/0324882 | A1 | 11/2018 | Gulati et al. |
| 2019/0007930 | A1 | 1/2019 | Zhao et al. |
| 2024/0107572 | A1* | 3/2024 | Paladugu ............ H04W 72/543 |

FOREIGN PATENT DOCUMENTS

| | | | |
|---|---|---|---|
| CN | 103813388 A | 5/2014 | |
| CN | 104954976 A | 9/2015 | |
| CN | 106412794 A | 2/2017 | |
| CN | 110113781 A | 8/2019 | |

OTHER PUBLICATIONS

Office Action for the Chinese Patent Application No. 201910755340.8 issued by the Chinese Patent Office on Feb. 8, 2022.

Examination Report for the Indian Patent Application No. 202227011607 issued by the Indian Patent Office on Jul. 18, 2022.
Extended European Search Report for the European Patent Application No. 20852557.6 issued by the European Patent Office on Jul. 22, 2022.
Sidelink resource allocation with relay UE, 3GPP TSG RAN WG1 Meeting #89, May 15-19, 2017, p. 1-7, R1-1708564, Nokia, Alcatel-Lucent Shanghai Bell, Hangzhou, China.
Considerations on sidelink UE-to-NW relaying mode, 3GPP TSG RAN WG1 Meeting #90, Aug. 21-25, 2017, R1-1712134, Huawei, HiSilicon, Prague, Czech Republic.
The First Office Action of Priority Application No. CN 201910755340.8 issued by the Chinese Patent Office on Jul. 6, 2021.
International Search Report and Written Opinion of International Application No. PCT/CN2020/109203 issued by the Chinese Patent Office on Nov. 18, 2020.

* cited by examiner

| Relay UE ID | LCID 1 or LCG ID 1 | Buffer size level 1 |
|---|---|---|
| LCID 2 or LCG ID 2 | | Buffer size level 2 or grant size level |

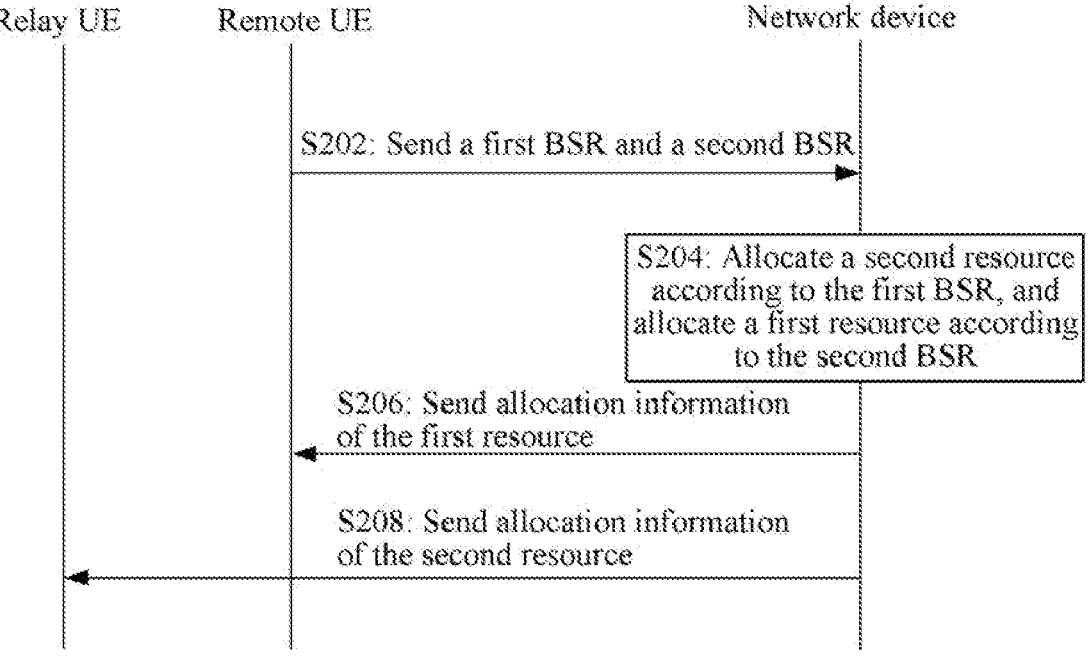
FIG. 5
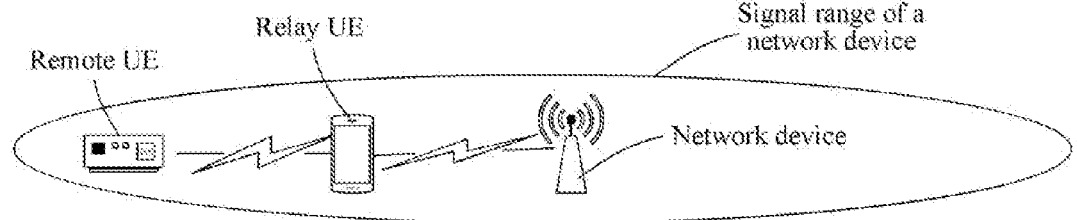
FIG. 6
FIG. 7

First BSR sending module  302

Resource request apparatus 300

First BSR receiving module  502

First resource allocation module 504

First resource information sending module  506

Resource allocation apparatus 500

Resource information
receiving module 602

Resource acquisition apparatus 600

RESOURCE REQUEST METHOD, ALLOCATION METHOD, AND ACQUISITION METHOD

CROSS-REFERENCE TO RELATED APPLICATIONS

This application is a Bypass Continuation Application of PCT/CN2020/109203 filed on Aug. 14, 2020, which claims priority to Chinese Patent Application No. 201910755340.8 filed on Aug. 15, 2019, which are incorporated herein by reference in their entirety.

TECHNICAL FIELD

Embodiments of the present disclosure relate to the communications field, and in particular, to a resource request method, a resource allocation method, and a resource acquisition method.

BACKGROUND

Long term evolution (LTE) systems support a sidelink from Release 12, and the sidelink is used for direct data transmission between user equipments (UEs) without going through a network device (for example, a base station). FIG. 1 is a schematic diagram of direct data transmission between UEs through a sidelink.

SUMMARY

According to a first aspect, an embodiment of the present disclosure provides a resource request method, applied to a remote user equipment (UE), the method including:

sending a first buffer status report (BSR) to network device, the first BSR being used for requesting a second resource from the network device, and the second resource being a resource used for data transmission from a relay UE to the network device.

According to a second aspect, an embodiment of the present disclosure provides a resource allocation method, applied to a network device, the method including:

receiving a first BSR sent by a remote UE, the first BSR being used for requesting a second resource from the network device, and the second resource being a resource used for data transmission from a relay UE to the network device;

allocating the second resource according to the first BSR; and sending allocation information of the second resource to the relay UE.

According to a third aspect, an embodiment of the present disclosure provides a resource acquisition method, applied to a relay UE, the method including:

receiving allocation information of a second resource sent by a network device, the second resource being a resource allocated by the network device according to a first BSR sent by a remote UE, the first BSR being used for requesting a first resource and the second resource, or the first BSR being used for requesting the second resource, the first resource being a resource used for data transmission from the remote UE to the relay UE, and the second resource being a resource used for data transmission from the relay UE to the network device.

According to a fourth aspect, an embodiment of the present disclosure provides a resource request apparatus, applied to a remote UE, the apparatus including:

a first BSR sending module, configured to send a first BSR to a network device, the first BSR being used for requesting a second resource from the network device, and the second resource being a resource used for data transmission from a relay UE to the network device.

According to a fifth aspect, an embodiment of the present disclosure provides a resource allocation apparatus, applied to a network device, the apparatus including:

a first BSR receiving module, configured to receive a first BSR sent by a remote UE, the first BSR being used for requesting a second resource from the network device, and the second resource being a resource used for data transmission from a relay UE to the network device;

a first resource allocation module, configured to allocate the second resource according to the first BSR; and a first resource information sending module, configured to send allocation information of the second resource to the relay UE.

According to a sixth aspect, an embodiment of the present disclosure provides a resource acquisition apparatus, applied to a relay UE, the apparatus including:

a resource information receiving module, configured to receive allocation information of a second resource sent by a network device, the second resource being a resource allocated by the network device according to a first BSR sent by a remote UE, the first BSR being used for requesting a first resource and the second resource, or the first BSR being used for requesting the second resource, the first resource being a resource used for data transmission from the remote UE to the relay UE, and the second resource being a resource used for data transmission from the relay UE to the network device.

According to a seventh aspect, an embodiment of the present disclosure provides a UE, including a processor, a memory, and a computer program stored in the memory and executable on the processor, where when the computer program is executed by the processor, steps of the foregoing resource request method are implemented.

According to an eighth aspect, an embodiment of the present disclosure provides a network device, including a processor, a memory, and a computer program stored in the memory and executable on the processor, where when the computer program is executed by the processor, steps of the foregoing resource allocation method are implemented.

According to a ninth aspect, an embodiment of the present disclosure provides a non-transitory computer-readable storage medium, storing a computer program, where when the computer program is executed by a processor, steps of the foregoing resource request method are implemented, or steps of the foregoing resource allocation method are implemented.

BRIEF DESCRIPTION OF THE DRAWINGS

For better understanding of the present disclosure, implementations of the present disclosure are described below with reference to the accompanying drawings, and the same or similar reference numerals represent the same or similar features.

FIG. 5 shows a time sequence diagram of a resource request method according to still another embodiment of the present disclosure;

FIG. 6 shows a schematic diagram of a format of a BSR according to another embodiment of the present disclosure;

FIG. 7 shows a schematic diagram of a communication scenario according to an embodiment of the present disclosure;

DETAILED DESCRIPTION

The following clearly describes embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

Currently, the LTE supports sidelink relay, and "relay" means that a base station or a user does not send a signal to each other directly, but forwards the signal after signal amplification or regeneration processing through a relay node. A simple two-hop relay system, for example, is to divide a "base station to mobile station" link into two links: "base station to relay node" and "relay node to mobile station", so that a poor-quality link can be replaced with two high-quality links, to achieve a higher link capacity and better coverage.

Usually, a remote UE and a relay UE can perform direct data transmission. However, before the remote UE and the relay UE perform direct data transmission, the remote UE and the relay UE need to acquire resources for the data transmission. However, in communication systems, it is inflexible for the remote UE and the relay UE to acquire resources for data transmission.

Figure 1:
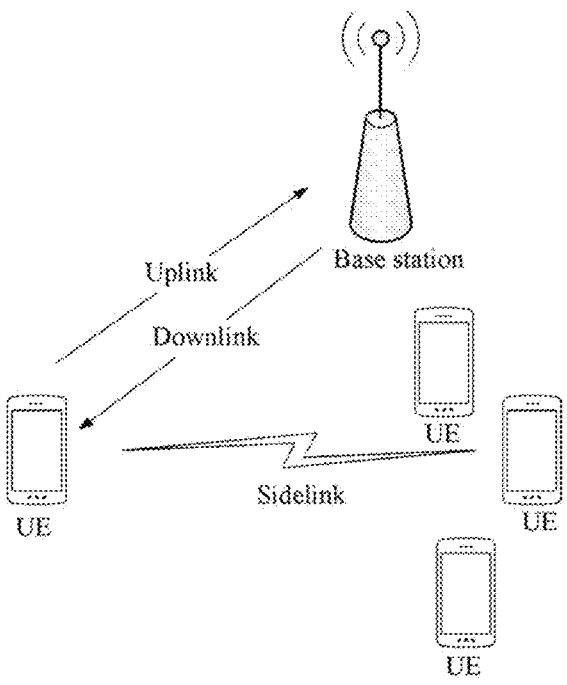
FIG. 1 shows a schematic diagram of direct data transmission between user equipments (UEs) through a sidelink.
Figure 2:
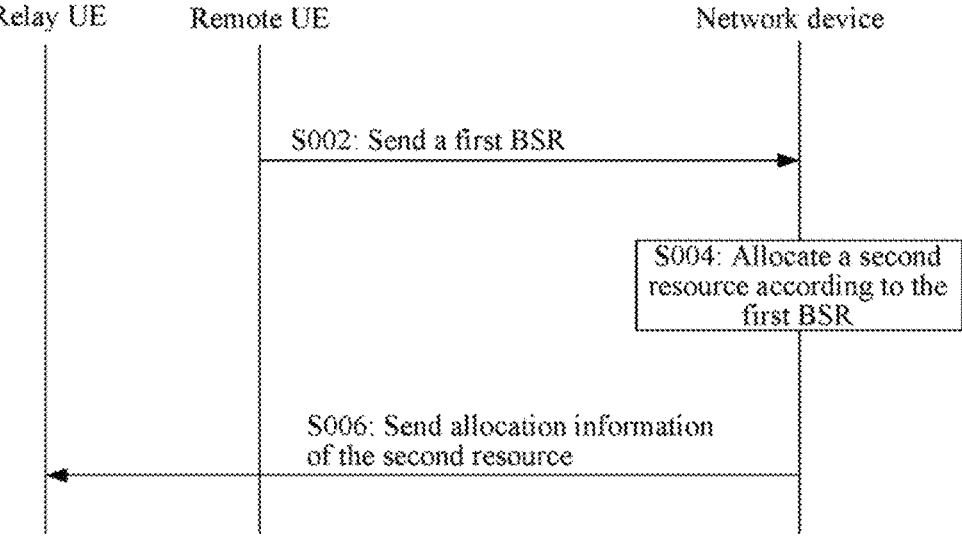
FIG. 2 shows a time sequence diagram of a principle of a resource request method according to an embodiment of the present disclosure.

FIG. 2 shows a schematic diagram of a principle of a resource request method according to an embodiment of the present disclosure.

As shown in FIG. 2, the resource request method includes the following steps:

S002: A remote user equipment (UE) sends a first buffer status report (BSR) to a network device, the first BSR being used for requesting a second resource from the network device, and the second resource being a resource for data transmission from a relay UE to the network device.

S004: The network device receives the first BSR, and allocates the second resource according to the first BSR.

S006: The network device sends allocation information of the second resource to the relay UE.

In this embodiment of the present disclosure, a first BSR sent by a remote UE can be used for requesting a second resource for data transmission from a relay UE to a network device, so that the resource acquisition flexibility is improved.

In an embodiment of the present disclosure, the first BSR may be further used for requesting a first resource from the network device, and the first resource is a resource used for data transmission from the remote UE to the relay UE.

Figures 3, 4:
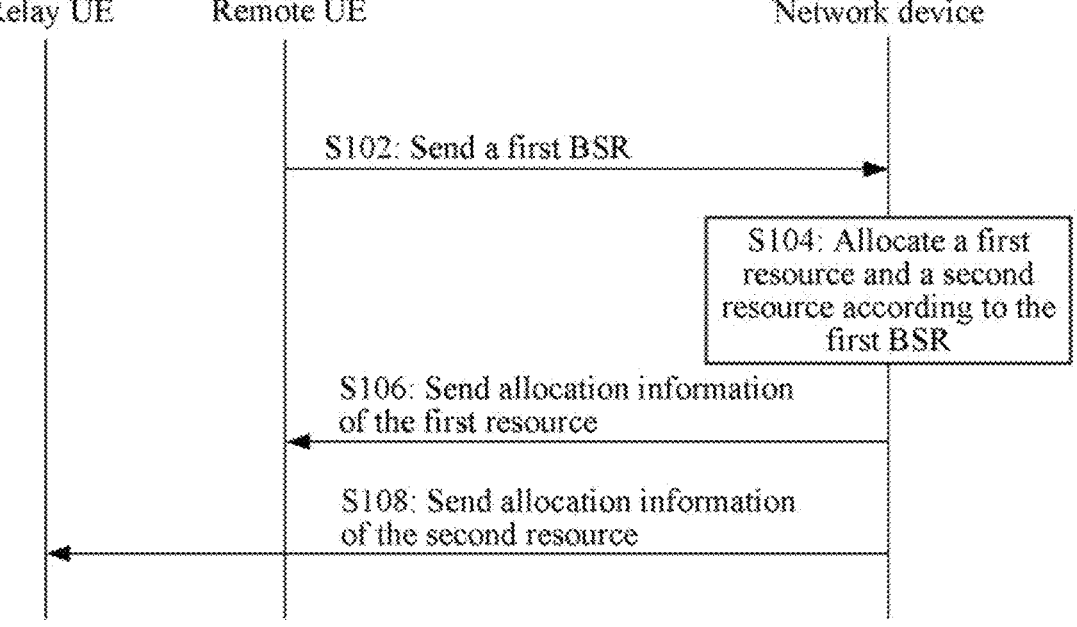
FIG. 3 shows a time sequence diagram of a resource request method according to another embodiment of the present disclosure.
FIG. 4 shows a schematic diagram of a format of a buffer status report (BSR) according to an embodiment of the present disclosure.

This embodiment of the present disclosure is described below with reference to FIG. 3. FIG. 3 shows a time sequence diagram of a resource request method according to another embodiment of the present disclosure. As shown in FIG. 3, the resource request method includes the following steps:

S102: A remote UE sends a first BSR to a network device, the first BSR being used for requesting a first resource and a second resource from the network device, the first resource being a resource used for data transmission from the remote UE to a relay UE, and the second resource being a resource used for data transmission from the relay UE to the network device.

The first BSR is an uplink BSR, the first resource is a sidelink resource, and the second resource is an uplink resource. In a case that the remote UE has pending uplink data, the remote UE sends an uplink BSR to a base station. The uplink BSR is used for requesting a sidelink resource used for transmitting the pending uplink data from the remote UE to the relay UE from the base station, and requesting an uplink resource used for transmitting the pending uplink data from the relay UE to the base station.

The resource request method further includes the following steps:

S104: The network device receives the first BSR, and allocates the first resource and the second resource according to the first BSR.

S106: The network device sends allocation information of the first resource to the remote UE, so that the remote UE sends data to the relay UE on the first resource.

S108: The network device sends allocation information of the second resource to the relay UE, so that the relay UE sends the data to the network device on the second resource.

In this embodiment of the present disclosure, a first BSR sent by a remote UE can be used for requesting a first resource for data transmission from the remote UE to a relay UE and a second resource for data transmission from the relay UE to a network device, that is, the remote UE can not only request the first resource required for data transmission thereof, but also request the second resource required for data transmission of the relay UE without requiring each of the remote UE and the relay UE to respectively request a resource, so that the resource acquisition efficiency is improved.

In an embodiment of the present disclosure, as shown in FIG. 4, a format of the first BSR may include a combination of the following domains:

1) a relay UE identifier (relay UE ID), for example, a cell radio network temporary identifier (C-RNTI) or a destination UE ID.

2) a logical channel identifier (LCID) from the relay UE to the network device, that is, an LCID 1 in FIG. 4. Alternatively, a logical channel group identifier (LCG ID) from the relay UE to the network device, that is, an LCG ID 1 in FIG. 4. The LCID 1 or the LCG ID 1 refers to a Uu LCID used for identifying a logical channel or a logical channel group from the relay UE to the network device.

3) an LCID from the remote UE to the relay UE, that is, an LCID 2 in FIG. 4. Alternatively, an LCG ID from the remote UE to the relay UE, that is, an LCG ID 2 in FIG. 4. The LCID 2 or the LCG ID 2 refers to a sidelink LCID mainly used for identifying a logical channel or a logical channel group of a sidelink from the remote UE to the relay UE.

4) a buffer size level from the relay UE to the network device, that is, a buffer size level 1 in FIG. 4, the buffer size 1 referring to a Uu buffer size.

5) a buffer size level or a grant size level from the remote UE to the relay UE, that is, a buffer size level 2 or a grant size level in FIG. 4, the buffer size level 2 referring to a sidelink buffer size level, and the grant size level referring to a sidelink grant size level.

A domain sequence included in the format of the first BSR is not limited to the sequence shown in FIG. 4.

In an embodiment of the present disclosure, in a header format of the first BSR, an LCID 1 value may be used for indicating a type of the first BSR, or an LCID 2 value and a reserved bit value may be used for indicating a type of the first BSR.

The header format of the first BSR is described below by using an example. For example, in the header format of the first BSR, an LCID value different from that in an existing technology (for example, a value 40 is selected from new radio (NR) uplink shared channel (UL-SCH) reserved LCID values 33 to 51) is used for indicating the type of the first BSR. Alternatively, in the header format of the first BSR, an LCID value in the related art (for example, a value the same as an LCID value 62 of an NR long BSR is selected) and a reserved R bit value are used for indicating the type of the first BSR.

In an embodiment of the present disclosure, the resource request method further includes: sending a second BSR to the network device, the second BSR being used for requesting a first resource from the network device, and the first resource being a resource used for data transmission from the remote UE to the relay UE.

This embodiment of the present disclosure is described below with reference to FIG. 5. FIG. 5 shows a time sequence diagram of a resource request method according to another embodiment of the present disclosure. As shown in FIG. 5, the resource request method includes the following steps:

S202: A remote UE sends a first BSR and a second BSR to a network device, the first BSR being used for requesting a second resource from the network device, the second BSR being used for requesting a first resource from the network device, the first resource being a resource used for data transmission from the remote UE to a relay UE, and the second resource being a resource used for data transmission from the relay UE to the network device.

S204: The network device receives the first BSR and the second BSR, allocates the second resource according to the first BSR, and allocates the first resource according to the second BSR.

S206: The network device sends allocation information of the first resource to the remote UE.

S208: The network device sends allocation information of the second resource to the relay UE.

In this embodiment of the present disclosure, in a case that the remote UE has pending uplink data, a first BSR and a second BSR can be sent, the first BSR being used for requesting the second resource for data transmission from the remote UE to the relay UE, and the second BSR being used for requesting the first resource for data transmission from the relay UE to the network device. Therefore, the remote UE can not only request the first resource required for data transmission thereof, but also request the second resource required for data transmission of the relay UE without requiring each of the remote UE and the relay UE to respectively request a resource. Therefore, the resource acquisition efficiency is improved.

In an embodiment of the present disclosure, as shown in FIG. 6, a format of the first BSR may include a combination of the following domains:

1) a relay UE ID, for example, a C-RNTI or a destination UE ID.

2) an LCID from the relay UE to the network device or an LCG ID from the relay UE to the network device.

3) a buffer size level from the relay UE to the network device.

A domain sequence included in the format of the first BSR is not limited to the sequence shown in FIG. 6.

In an embodiment of the present disclosure, in a header format of the first BSR, an LCID 1 value is used for indicating a type of the first BSR, or an LCID 2 value and a reserved bit value are used for indicating a type of the first BSR.

The header format of the first BSR is described below by using an example. For example, in the header format of the first BSR, an LCID value different from that in the related art (for example, a value 40 is selected from NR UL-SCH reserved LCID values 33 to 51) is used for indicating the type of the first BSR. Alternatively, in the header format of the first BSR, an LCID value in the related art (for example, a value the same as an LCID value 62 of an NR long BSR is selected) and a reserved R bit value are used for indicating the type of the first BSR.

In an embodiment of the present disclosure, for example, in the embodiment of FIG. 2, FIG. 3 or FIG. 5, the resource request method may further include the following steps.

The network device sends notification information to the remote UE, the notification information being used for notifying the remote UE that the second resource has been allocated, so that the remote UE receives the notification information sent by the network device. That is, the network device notifies the remote UE that the network device has allocated the second resource for the relay UE.

In an embodiment of the present disclosure, after the relay UE receives information about the second resource allocated by the network device, the resource request method may further include the following steps.

The relay UE sends notification information to the remote UE, the notification information being used for notifying the remote UE that the second resource has been allocated, so that the remote UE receives the notification information sent by the relay UE. That is, the relay UE notifies the remote UE that the network device has allocated the second resource for the relay UE.

In an embodiment of the present disclosure, after the remote UE receives the notification information sent by the network device or the relay UE, the resource request method may further include the following steps.

The remote UE starts or restarts a retransmission BSR timer in a case that the remote UE has a triggered first BSR, and sending of the triggered first BSR is not canceled.

In an embodiment of the present disclosure, the resource request method may further include the following steps.

The remote UE triggers the first BSR for retransmission in a case that the remote UE has to-be-forwarded uplink data and the retransmission BSR timer expires, indicating that a BSR retransmission condition is met.

In an embodiment of the present disclosure, the resource request method may further include the following steps.

In a case that the remote UE meets a condition for canceling the BSR, at least one of the following is performed: canceling sending of the triggered first BSR, stopping the retransmission BSR timer, or stopping a periodic BSR timer.

The condition for canceling the BSR includes at least one of: reselecting a relay UE, stopping a relay operation, or switching from a relay communication mode to a non-relay communication mode.

The relay UE re-selection includes at least one of: relay UE re-selection due to a sidelink measurement result being lower than a threshold, relay UE re-selection caused by an upper layer reason, or relay UE re-selection due to the relay UE stopping providing a service for the remote UE.

The relay stop operation includes: termination of communication with the network device, or direct communication with the network device without going through the relay UE.

FIG. 7 shows a schematic diagram of a communication scenario according to an embodiment of the present disclosure, and the embodiment of FIG. 2, FIG. 3, or FIG. 5 is applied to the communication scenario. As shown in FIG. 7, a remote UE and a relay UE are within a signal coverage of a network device. The remote UE is connected to the relay UE through a PC5 radio interface (corresponding to a sidelink), and the relay UE is connected to the network device through a Uu radio interface (corresponding to an uplink plus a downlink).

1) Both the remote UE and the relay UE are in a radio resource control (RRC) connection state. 2) Uplink data of the remote UE is forwarded to the network device through the relay UE.

A lone term evolution (LTE) sidelink is designed for a specific public safety affair (for example, emergency communication at a disaster site such as a fire or an earthquake), vehicle to everything (V2X) communication, or the like. The V2X communication includes various services, for example, basic security communication, advanced (autonomous) driving, formation, or sensor expansion. Because the LTE sidelink supports broadcast communication, it is mainly used for basic security communication. Other advanced V2X services with a strict requirement for quality of service (QoS) in terms of delay, reliability, or the like are supported by a new radio (NR) sidelink.

Figures 8, 9:
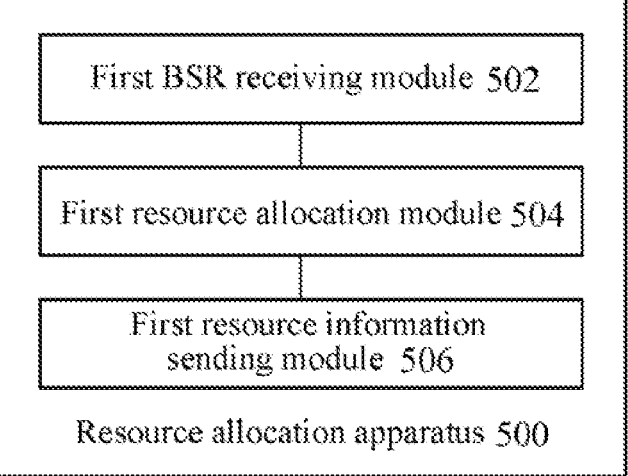
FIG. 8 shows a schematic structural diagram of a resource request apparatus according to an embodiment of the present disclosure.
FIG. 9 shows a schematic structural diagram of a resource allocation apparatus according to an embodiment of the present disclosure.

FIG. 8 shows a schematic structural diagram of a resource request apparatus 300 according to an embodiment of the present disclosure. The resource request apparatus is applied to remote UE, as shown in FIG. 8, a resource request apparatus 300 including:

a first BSR sending module 302, configured to send a first BSR to a network device, the first BSR being used for requesting a second resource from the network device, and the second resource being a resource used for data transmission from a relay UE to the network device.

In an embodiment of the present disclosure, the first BSR is further used for requesting a first resource from the network device, and the first resource is a resource used for data transmission from the remote UE to the relay UE.

In an embodiment of the present disclosure, the resource request apparatus 300 may further include:

a second BSR sending module, configured to send a second BSR to the network device, the second BSR being used for requesting a first resource from the network device, and the first resource being a resource used for data transmission from the remote UE to the relay UE.

In an embodiment of the present disclosure, a format of the first BSR may further include a combination of:

a relay UE ID, an LCID from the relay UE to the network device or an LCG ID from the relay UE to the network device, an LCID from the remote UE to the relay UE or an LCG ID from the remote UE to the relay UE, a buffer size level from the relay UE to the network device, or a buffer size level or a grant size level from the remote UE to the relay UE.

In an embodiment of the present disclosure, a format of the first BSR includes a combination of:

a relay UE ID, an LCID from the relay UE to the network device or an LCG ID from the relay UE to the network device, or a buffer size level from the relay UE to the network device.

In an embodiment of the present disclosure, in a header format of the first BSR, an LCID 1 value is used for indicating a type of the first BSR, or an LCID 2 value and a reserved bit value are used for indicating a type of the first BSR.

In an embodiment of the present disclosure, the resource request apparatus 300 may further include:

a first communication information receiving module, configured to receive notification information sent by the network device or the relay UE, the notification information being used for notifying the remote UE that the second resource has been allocated.

In an embodiment of the present disclosure, the resource request apparatus 300 may further include:

a timer start module, configured to start or restart a retransmission BSR timer in a case that there is a triggered first BSR and sending of the triggered first BSR is not canceled.

In an embodiment of the present disclosure, the resource request apparatus 300 may further include:

a BSR triggering module, configured to trigger the first BSR for retransmission in a case that there is to-be-forwarded uplink data and the retransmission BSR timer expires.

In an embodiment of the present disclosure, the resource request apparatus 300 may further include:

an execution module, configured to perform, in a case that the remote UE meets a condition for canceling the BSR, at least one of: canceling sending of the triggered first BSR, stopping the retransmission BSR timer, or stopping a periodic BSR timer. The condition for canceling the BSR includes at least one of: reselecting a relay UE, stopping a relay operation, or switching from a relay communication mode to a non-relay communication mode.

FIG. 9 shows a schematic structural diagram of a resource allocation apparatus 500 according to an embodiment of the present disclosure.

The resource allocation apparatus is applied to a network device. As shown in FIG. 9, the resource allocation apparatus 500 includes:

a first BSR receiving module 502, configured to receive a first BSR sent by a remote UE, the first BSR being used for requesting a second resource from the network device, and the second resource being a resource used for data transmission from a relay UE to the network device;

a first resource allocation module 504, configured to allocate the second resource according to the first BSR; and a first resource information sending module 506, configured to send allocation information of the second resource to the relay UE.

In an embodiment of the present disclosure, the first BSR is further used for requesting a first resource from the network device, and the first resource is a resource used for data transmission from the remote UE to the relay UE. The resource allocation apparatus 500 further includes:

a second resource allocation module, configured to allocate the first resource for data transmission from the remote UE to the relay UE according to the first BSR; and a second resource information sending module, configured to send allocation information of the first resource to the remote UE.

In an embodiment of the present disclosure, the resource allocation apparatus 500 may further include:

a second BSR receiving module, configured to receive a second BSR sent by the remote UE, the second BSR being used for requesting a first resource from the network device, and the first resource being a resource used for data transmission from the remote UE to the relay UE;

a third resource allocation module, configured to allocate the first resource for data transmission from the remote UE to the relay UE according to the second BSR; and a third resource information sending module, configured to send allocation information of the first resource. The allocation information of the first resource may be sent to the remote UE.

Figures 10, 11:
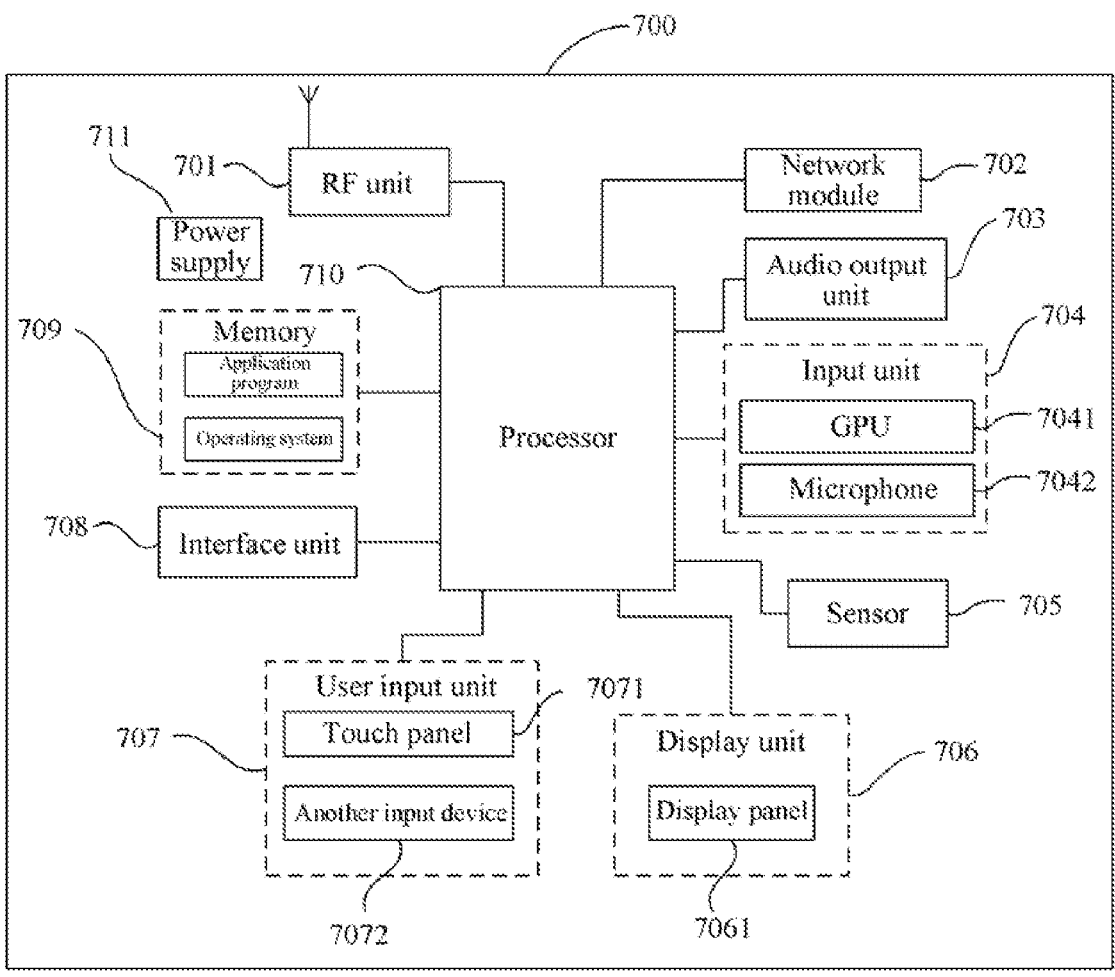
FIG. 10 shows a schematic structural diagram of a resource acquisition apparatus according to an embodiment of the present disclosure.
FIG. 11 shows a schematic structural diagram of hardware of a user equipment (UE) according to an embodiment of the present disclosure.

FIG. 10 shows a schematic structural diagram of a resource acquisition apparatus 600 according to an embodiment of the present disclosure. The resource acquisition apparatus is applied to a relay UE. As shown in FIG. 10, the resource acquisition apparatus 600 includes:

a resource information receiving module 602, configured to receive allocation information of a second resource sent by a network device, the second resource being a resource allocated by the network device according to a first BSR sent by a remote UE, the first BSR being used for requesting a first resource and the second resource, or the first BSR being used for requesting the second resource, the first resource being a resource used for data transmission from the remote UE to the relay UE, and the second resource being a resource used for data transmission from the relay UE to the network device.

An embodiment of the present disclosure further provides a UE, including a processor, a memory, and a computer program stored in the memory and executable on the processor, where when the computer program is executed by the processor, various processes of the embodiments of the foregoing resource request method are implemented, and can achieve the same technical effects. To avoid repetition, details are not described herein again.

An example is used below for description of the UE in this embodiment of the present disclosure.

FIG. 11 shows a schematic structural diagram of hardware of a UE 700 according to an embodiment of the present disclosure. The UE 700 includes, but is not limited to, components such as a radio frequency (RF) unit 701, a network module 702, an audio output unit 703, an input unit 704, a sensor 705, a display unit 706, a user input unit 707, an interface unit 708, a memory 709, a processor 710, and a power supply 711. A person skilled in the art may understand that the structure of the UE shown in FIG. 11 does not constitute a limitation to the UE, and the UE may include more components or fewer components than those shown in the figure, or some components may be combined, or a different component deployment may be used. The UE in this embodiment of the present disclosure includes, but is not limited to, a mobile phone, a tablet computer, a notebook computer, a palmtop computer, a vehicle-mounted terminal, a wearable device, a pedometer, and the like.

The RF unit 701 is configured to send a first BSR to a network device, the first BSR being used for requesting a first resource and a second resource from the network device, the first resource being a resource used for data transmission from a remote UE to a relay UE, and the second resource being a resource used for data transmission from the relay UE to the network device; and receive allocation information of the first resource sent by the network device. The adoption of the RF unit can achieve the same technical effects as the embodiment of FIG. 2 above, which is not repeated herein.

Alternatively, the RF unit 701 is configured to send a second BSR and a first BSR to the network device, the second BSR being used for requesting a first resource from the network device, the first BSR being used for requesting a second resource from the network device, the first resource being a resource used for data transmission from a remote UE to a relay UE, and the second resource being a resource used for data transmission from the relay UE to the network device; and receive allocation information of the first resource sent by the network device. The adoption of the RF unit can achieve the same technical effects as the embodiment of FIG. 5 above, which is not repeated herein.

It should be understood that, the RF unit 701 may be configured to receive and send a signal during an information receiving and sending process or a call process. For example, the RF unit is configured to receive downlink data from a base station, and then send the downlink data to the processor 710 for processing; and in addition, send uplink data to the base station. Generally, the RF unit 701 includes, but is not limited to, an antenna, at least one amplifier, a transceiver, a coupler, a low noise amplifier, a duplexer, and the like. In addition, the RF unit 701 may further communicate with a network device or another device through a wireless communications system.

The UE provides wireless broadband Internet access for a user by using the network module 702. For example, the UE helps the user to receive and send an email, browse a webpage, and access stream media, and the like.

The audio output unit 703 may convert audio data received by the RF unit 701 or the network module 702, or stored in the memory 709 into an audio signal and output the audio signal as a sound. In addition, the audio output unit 703 may further provide an audio output (for example, a call signal receiving sound or a message receiving sound) related to a specific function executed by the UE 700. The audio output unit 703 includes a loudspeaker, a buzzer, a receiver, and the like.

The input unit 704 is configured to receive an audio signal or a video signal. The input unit 704 may include a graphics processing unit (GPU) 7041 and a microphone 7042. The GPU 7041 is configured to process image data of a static picture or a video obtained by an image capture apparatus (for example, a camera) in a video capture mode or an image capture mode. An image frame that has been processed may be displayed on the display unit 706. The image frame that has been processed by the GPU 7041 may be stored in the memory 709 (or another storage medium) or sent by using the RF unit 701 or the network module 702. The microphone 7042 may receive a sound, and can process the sound into audio data. The processed audio data may be converted, in a phone talk mode, into a format that may be sent to a mobile communication base station through the RF unit 701 for output.

The UE 700 may further include at least one sensor 705, for example, an optical sensor, a motion sensor, and another sensor. For example, the optical sensor includes an ambient light sensor and a proximity sensor. The ambient light sensor may adjust luminance of the display panel 7061 according to brightness of ambient light. The proximity sensor may switch off the display panel 7061 and/or backlight when the UE 700 is moved to the ear. As one type of motion sensor, an accelerometer sensor may detect a magnitude of acceleration in various directions (generally three axes), and may detect a magnitude and a direction of gravity when static, which may be configured to recognize UE gestures (for example, horizontal and vertical screen switching, related games, and magnetometer posture calibration), vibration recognition related functions (for example, pedometer and tap), and the like. The sensor 705 may further include a fingerprint sensor, a pressure sensor, an iris sensor, a molecular sensor, a gyroscope, a barometer, a hygrometer, a thermometer, and an infrared sensor, and details are not described herein.

The display unit 706 is configured to display information entered by the user or information provided for the user. The display unit 706 may include a display panel 7061, which may be configured by using a liquid crystal display (LCD), an organic light-emitting diode (OLED), or the like.

The user input unit 707 may be configured to receive inputted digital or character information, and generate a key signal input related to user settings and function control of the UE. For example, the user input unit 707 includes a touch panel 7071 and another input device 7072. The touch panel 7071, also referred to as a touchscreen, may collect a touch operation of a user on or near the touch panel (for example, an operation of a user on the touch panel 7071 or near the touch panel 7071 by using any suitable object or accessory such as a finger or a stylus). The touch panel 7071 may include a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into a contact coordinate, then sends the contact coordinate to the processor 710, and receives and executes a command sent by the processor 710. In addition, the touch panel 7071 may be of a resistive type, a capacitive type, an infrared type, or a surface acoustic wave (SAW) type. In addition to the touch panel 7071, the user input unit 707 may further include the another input device 7072. For example, the another input device 7072 includes, but is not limited to, a physical keyboard, a functional key (for example, a volume control key or a switch key), a trackball, a mouse, and a joystick. Details are not described herein again.

Optionally, the touch panel 7071 may cover the display panel 7061. After detecting a touch operation on or near the touch panel 7071, the touch panel transfers the touch operation to the processor 710, so as to determine a type of the touch event. Then, the processor 710 provides corresponding visual output on the display panel 7061 according to the type of the touch event. Although, in FIG. 11, the touch panel 7071 and the display panel 7061 are used as two separate parts to implement input and output functions of the UE. In some embodiments, the touch panel 7071 and the display panel 7061 may be integrated to implement the input and output functions of the UE, which is not limited herein.

The interface unit 708 is an interface used for connecting an external apparatus to the UE 700. For example, the external apparatus may include a wired or wireless headset port, an external power supply (or a battery charger) port, a wired or wireless data port, a storage card port, a port used to for connecting an apparatus having an identification module, an audio input/output (I/O) port, a video I/O port, an earphone port, and the like. The interface unit 708 may be configured to receive an input (for example, data information or power) from the external apparatus, and transmit the received input to one or more elements in the UE 700, or may be configured to transmit data between the UE 700 and the external apparatus.

The memory 709 may be configured to store a software program and various data. The memory 709 may mainly include a program storage area and a data storage area. The program storage area may store an operating system, an application program required by at least one function (for example, a sound playback function and an image playback function), or the like. The data storage area may store data (for example, audio data and a phone book) created according to use of the mobile phone.

In addition, the memory 709 may include a high speed random access memory, and may further include a non-volatile memory, for example, at least one magnetic disk storage device, a flash memory device, or another non-volatile solid state storage device.

The processor 710 is a control center of the UE, and is connected to various parts of the UE by using various interfaces and lines. By running or executing the software program and/or module stored in the memory 709, and invoking data stored in the memory 709, the processor performs various functions and data processing of the UE, thereby performing overall monitoring on the UE. The processor 710 may include one or more processing units. Optionally, the processor 710 may integrate an application processor and a modem processor, where the application processor mainly processes an operating system, a user interface, an application program, and the like, and the modem processor mainly processes wireless communications. It may be understood that the foregoing modem may either not be integrated into the processor 710.

The UE 700 may further include the power supply 711 (such as a battery) for supplying power to the components. Optionally, the power supply 711 may be logically connected to the processor 710 by using a power management system, thereby implementing functions such as charging, discharging, and power consumption management by using the power management system.

In addition, the UE 700 includes some functional modules that are not shown. Details are not described herein again.

An embodiment of the present disclosure further provides a network device, including a processor, a memory, and a computer program stored in the memory and executable on the processor, where when the computer program is executed by the processor, various processes of the embodiments of the foregoing resource allocation method are implemented, and can achieve the same technical effects. To avoid repetition, details are not described herein again.

An embodiment of the present disclosure further provides a non-transitory computer-readable storage medium, storing a computer program, where when the computer program is executed by a processor, various processes of the embodiments of the foregoing resource request method or the foregoing resource allocation method are implemented, and can achieve the same technical effects. To avoid repetition, details are not described herein again. The non-transitory computer-readable storage medium includes, for example, a read-only memory (ROM), a random access memory (RAM), a magnetic disk, or an optical disc.

It should be noted that, the terms "include", "comprise", and any variants thereof are intended to cover a non-exclusive inclusion. Therefore, in the context of a process, method, object, or apparatus that includes a series of elements, the process, method, object, or apparatus not only includes such elements, but also includes other elements not specified expressly, or may include inherent elements of the process, method, object, or apparatus. Without more limitations, elements defined by the sentence "including one" does not exclude that there are still other same elements in the processes, methods, objects, or apparatuses. In addition, the relational terms such as "first" and "second" are only used to differentiate an entity or operation from another, and do not necessarily require or imply any actual relationship or sequence between these entities or operations.

Flowcharts and block diagrams in the drawings illustrate architectures, functions, and operations of possible implementations by using the system, the method, and the computer program product according to the various embodiments of the present disclosure. In this regard, each block in the flowchart or the block diagram may represent a module, a segment, or a part of a code. The module, the segment, or the part of the code includes one or more executable instructions used for implementing one or more specified logical functions. It should also be noted that, in some implementations used as substitutes, functions annotated in boxes may alternatively occur in a sequence different from that annotated in an accompanying drawing. For example, depending on involved functions, two consecutive blocks shown in succession may be actually executed substantially at the same time, or the blocks may sometimes be executed in a reverse order. It should further be noted that, each box in a block diagram and/or a flowchart and a combination of boxes in the block diagram and/or the flowchart may be implemented by using a dedicated hardware-based system configured to perform a specified function or action, or may be implemented by using a combination of dedicated hardware and a computer instruction.

According to the descriptions in the foregoing implementations, a person skilled in the art can clearly learn that the foregoing embodiment methods may be implemented by using software in combination with a necessary universal hardware platform. Certainly, the method embodiments may also be implemented by using hardware, software, or a combination of the two, but the former is a preferred implementation in many cases. Based on such an understanding, the technical solutions of the present disclosure essentially or the part contributing to the existing technology may be implemented in a form of a software product. A computer software product is stored in a storage medium (for example, a ROM/RAM, a magnetic disk, or an optical disc) and includes several instructions for instructing a terminal (a mobile phone, a computer, a server, an air conditioner, or a network device) to perform the methods described in the embodiments of the present disclosure.

The embodiments of the present disclosure have been described above with reference to the accompanying drawings. The present disclosure is not limited to the embodiments described above, and the embodiments described above are merely exemplary and not limitative. A person of ordinary skill in the art may make various variations under the teaching of the present disclosure without departing from the spirit of the present disclosure and the protection scope of the claims, and such variations shall all fall within the protection scope of the present disclosure.

What is claimed is:

1. A resource request method, applied to a remote user equipment, the method comprising:

sending, by the remote user equipment, a first buffer status report (BSR) to a network device, the first BSR being used for requesting a second resource from the network device, the second resource being a resource used for data transmission from a relay user equipment to the network device, and the second resource being an uplink resource; wherein in a header format of the first BSR, a first logical channel identifier value is used for indicating a type of the first BSR, or a second logical channel identifier value and a reserved bit value are used for indicating a type of the first BSR.

2. The method according to claim 1, wherein the first BSR is further used for requesting a first resource from the network device, and the first resource is a resource used for data transmission from the remote user equipment to the relay user equipment.

3. The method according to claim 1, further comprising:

sending a second BSR to the network device, the second BSR being used for requesting a first resource from the network device, and the first resource being a resource used for data transmission from the remote user equipment to the relay user equipment.

4. The method according to claim 2, wherein a format of the first BSR comprises a combination of:

a relay user equipment identifier, a logical channel identifier from the relay user equipment to the network device or a logical channel group identifier from the relay user equipment to the network device, a logical channel identifier from the remote user equipment to the relay user equipment or a logical channel group identifier from the remote user equipment to the relay user equipment, a buffer size level from the relay user equipment to the network device, or a buffer size level or a grant size level from the remote user equipment to the relay user equipment.

5. The method according to claim 3, wherein a format of the first BSR comprises a combination of:

a relay user equipment identifier, a logical channel identifier from the relay user equipment to the network device or a logical channel group identifier from the relay user equipment to the network device, or a buffer size level from the relay user equipment to the network device.

6. The method according to claim 1, further comprising:

receiving notification information sent by the network device or the relay user equipment, the notification information being used for notifying the remote user equipment that the second resource has been allocated.

7. The method according to claim 6, wherein after the receiving notification information sent by the network device or the relay user equipment, the method further comprises:

starting or restarting a retransmission BSR timer in a case that there is a triggered first BSR and sending of the triggered first BSR is not canceled.

8. The method according to claim 7, further comprising:

triggering the first BSR for retransmission in a case that there is to-be-forwarded uplink data and the retransmission BSR timer expires.

9. The method according to claim 7, further comprising:

in a case that the remote user equipment meets a condition for canceling a BSR, performing at least one of: canceling sending of the triggered first BSR, stopping the retransmission BSR timer, or stopping a periodic BSR timer; wherein the condition for canceling the BSR comprises at least one of:

reselecting a relay user equipment, stopping a relay operation, or switching from a relay communication mode to a non-relay communication mode.

10. A resource allocation method, applied to a network device, the method comprising:

receiving a first buffer status report (BSR) sent by a remote user equipment, the first BSR being used for requesting a second resource from the network device, the second resource being a resource used for data transmission from a relay user equipment to the network device, and the second resource being an uplink resource;

allocating the second resource according to the first BSR; and sending allocation information of the second resource to the relay user equipment; wherein in a header format of the first BSR, a first logical channel identifier value is used for indicating a type of the first BSR, or a second logical channel identifier value and a reserved bit value are used for indicating a type of the first BSR.

11. The method according to claim 10, wherein the first BSR is further used for requesting a first resource from the network device, and the first resource is a resource used for data transmission from the remote user equipment to the relay user equipment; and the method further comprises:

allocating the first resource for data transmission from the remote user equipment to the relay user equipment according to the first BSR; and sending allocation information of the first resource to the remote user equipment.

12. The method according to claim 10, further comprising:

receiving a second BSR sent by the remote user equipment, the second BSR being used for requesting a first resource from the network device, and the first resource being a resource used for data transmission from the remote user equipment to the relay user equipment; and the method further comprising:

allocating the first resource for data transmission from the remote user equipment to the relay user equipment according to the second BSR; and sending allocation information of the first resource.

13. The method according to claim 11, wherein a format of the first BSR comprises a combination of:

a relay user equipment identifier, a logical channel identifier from the relay user equipment to the network device or a logical channel group identifier from the relay user equipment to the network device, a logical channel identifier from the remote user equipment to the relay user equipment or a logical channel group identifier from the remote user equipment to the relay user equipment, a buffer size level from the relay user equipment to the network device, or a buffer size level or a grant size level from the remote user equipment to the relay user equipment.

14. The method according to claim 12, wherein a format of the first BSR comprises a combination of:

a relay user equipment identifier, a logical channel identifier from the relay user equipment to the network device or a logical channel group identifier from the relay user equipment to the network device, or a buffer size level from the relay user equipment to the network device.

15. The method according to claim 10, further comprising:

sending notification information to the remote user equipment, the notification information being used for notifying the remote user equipment that the second resource has been allocated.

16. A resource acquisition method, applied to a relay user equipment, the method comprising:

receiving allocation information of a second resource sent by a network device, the second resource being a resource allocated by the network device according to a first buffer status report (BSR) sent by a remote user equipment, the first BSR being used for requesting a first resource and the second resource, or the first BSR being used for requesting the second resource, the first resource being a resource used for data transmission from the remote user equipment to the relay user equipment, the second resource being a resource used for data transmission from the relay user equipment to the network device, and the second resource being an uplink resource; wherein in a header format of the first BSR, a first logical channel identifier value is used for indicating a type of the first BSR, or a second logical channel identifier value and a reserved bit value are used for indicating a type of the first BSR.

17. The method according to claim 16, wherein after the receiving allocation information of a second resource sent by a network device, the method further comprises:

sending notification information to the remote user equipment, the notification information being used for notifying the remote user equipment that the second resource has been allocated.

18. A user equipment, comprising a processor, a non-transitory memory, and a computer program stored in the non-transitory memory and executable on the processor, wherein when the computer program is executed by the processor, steps of the resource request method according to claim 1 are implemented.

* * * * *